(12) United States Patent
Rachui et al.

(10) Patent No.: US 10,871,411 B2
(45) Date of Patent: Dec. 22, 2020

(54) STATOR HOLDER, STATOR ASSEMBLY, METHOD FOR ASSEMBLING A STATOR ASSEMBLY, TORQUE SENSOR DEVICE WITH A STATOR ASSEMBLY AND A STATOR HOLDER, AND MOTOR VEHICLE WITH A TORQUE SENSOR DEVICE

(71) Applicant: VALEO Schalter und Sensoren GmbH, Bietigheim-Bissingen (DE)

(72) Inventors: Dirk Rachui, Bietigheim-Bissingen (DE); Ekkehart Fröhlich, Bietigheim-Bissingen (DE); Jens Thom, Boeblingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 303 days.

(21) Appl. No.: 16/062,937

(22) PCT Filed: Dec. 9, 2016

(86) PCT No.: PCT/EP2016/080386
§ 371 (c)(1),
(2) Date: Nov. 13, 2018

(87) PCT Pub. No.: WO2017/102576
PCT Pub. Date: Jun. 22, 2017

(65) Prior Publication Data
US 2019/0072445 A1    Mar. 7, 2019

(30) Foreign Application Priority Data
Dec. 18, 2015 (DE) .................. 10 2015 122 171

(51) Int. Cl.
*G01L 5/22* (2006.01)
*G01L 3/10* (2006.01)

(52) U.S. Cl.
CPC .............. *G01L 5/221* (2013.01); *G01L 3/104* (2013.01); *G01L 3/10* (2013.01); *G01L 3/101* (2013.01);
(Continued)

(58) Field of Classification Search
CPC . G01L 3/00; G01L 3/104; G01L 3/101; G01L 3/105; G01L 3/109; G01L 3/102; G01L 3/10; G01L 5/221
See application file for complete search history.

(56) References Cited

U.S. PATENT DOCUMENTS 7,406,884 B2 * 8/2008 Jerems .................. G01L 3/101
73/862.331
8,943,879 B2 * 2/2015 Kang ...................... B62D 6/10
73/117.02

(Continued)

FOREIGN PATENT DOCUMENTS

DE    10 2005 018 286 A1    10/2006
DE    10 2011 111 846 A1    2/2013

(Continued)

OTHER PUBLICATIONS

International Search Report issued in PCT/EP2016/080386 dated Jan. 30, 2017 (2 pages).

(Continued)

*Primary Examiner* — Jonathan M Dunlap
(74) *Attorney, Agent, or Firm* — Osha Bergman Watanabe & Burton LLP

(57) ABSTRACT

The invention relates to a stator holder (11) for a torque sensor device for sensing a torque applied to a shaft, in particular for sensing a torque applied to a steering shaft of a motor vehicle, and to a stator assembly (20) with such a stator holder (11), a method for assembling such a stator assembly (20), a torque sensor device with such a stator (Continued)

Figure 1A:
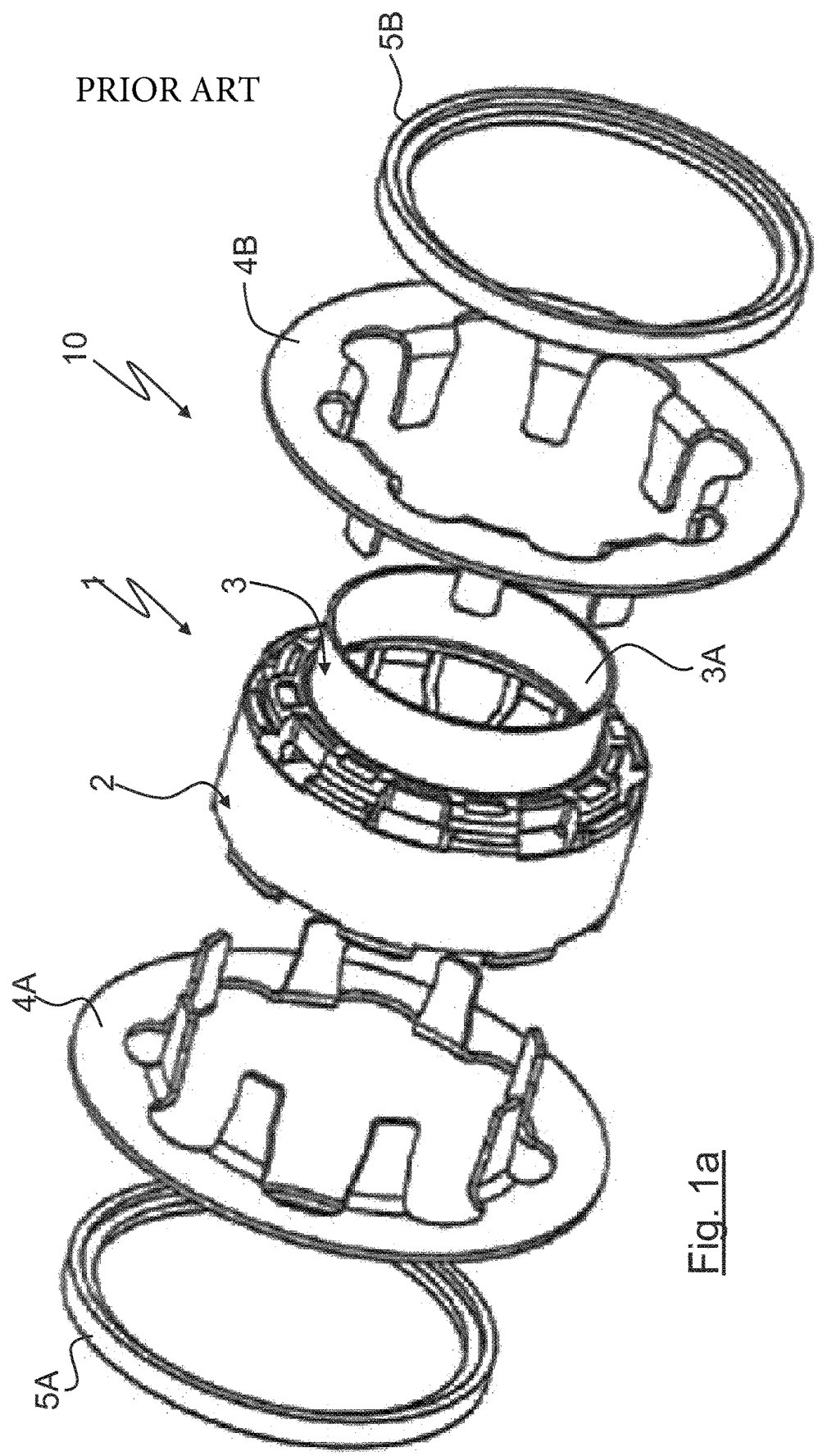

holder (11) and a motor vehicle with such a torque sensor device. The stator holder (11) has a receiving region (12) extending in the axial direction along an axis of rotation of the stator holder (11) and a fastening region (13) which, in a functional use state, is adjacent to the receiving region (12) in the axial direction and extends in the axial direction along the axis of rotation of the stator holder (11), wherein the receiving region (12) is designed for receiving a first stator element (14A) and a second stator element (14B) on the stator holder (11), and wherein the fastening region (13) has a fastening sleeve (13A) for the fastening of the stator holder (11) on the shaft for rotation therewith. The receiving region (12) and the fastening region (13) are formed here by separate components and/or separate assemblies.

9 Claims, 5 Drawing Sheets

(52) U.S. Cl.
CPC ............. *G01L 3/102* (2013.01); *G01L 3/105* (2013.01); *G01L 3/109* (2013.01)

(56) References Cited

U.S. PATENT DOCUMENTS

| | | | | |
|---|---|---|---|---|
| 9,004,221 | B2* | 4/2015 | Yoshida | G01L 5/221 |
| | | | | 180/444 |
| 9,255,854 | B2* | 2/2016 | Kim | G01L 3/02 |
| 9,302,700 | B2* | 4/2016 | Yoshida | G01L 5/221 |
| 9,434,410 | B2* | 9/2016 | Lee | B62D 6/10 |
| 2005/0247138 | A1 | 11/2005 | Nakane et al. | |
| 2006/0081070 | A1* | 4/2006 | Madni | G01D 5/202 |
| | | | | 73/862.325 |
| 2007/0157740 | A1* | 7/2007 | Jerems | G01L 3/104 |
| | | | | 73/862.328 |
| 2012/0297916 | A1* | 11/2012 | Lee | B62D 5/0457 |
| | | | | 74/492 |
| 2012/0312088 | A1* | 12/2012 | Kang | B62D 6/10 |
| | | | | 73/117.02 |
| 2014/0076654 | A1* | 3/2014 | Yoshida | B62D 5/0463 |
| | | | | 180/446 |
| 2014/0076655 | A1* | 3/2014 | Yoshida | B62D 5/0463 |
| | | | | 180/446 |
| 2015/0090051 | A1* | 4/2015 | Lee | G01L 3/104 |
| | | | | 73/862.193 |
| 2015/0276524 | A1 | 10/2015 | Schoepe et al. | |
| 2016/0109308 | A1* | 4/2016 | Kim | G01L 3/104 |
| | | | | 73/862.195 |
| 2016/0238471 | A1* | 8/2016 | Son | G01L 3/104 |

FOREIGN PATENT DOCUMENTS

| | | |
|---|---|---|
| DE | 10 2013 006379 A1 | 10/2014 |
| DE | 11 2013 003921 T5 | 5/2015 |
| EP | 1 269 133 B1 | 5/2004 |
| EP | 1 464 935 A1 | 10/2004 |
| EP | 1 706 716 B1 | 9/2011 |
| EP | 2 181 314 B1 | 12/2013 |

OTHER PUBLICATIONS

Written Opinion of the International Searching Authority issued in PCT/EP2016/080386 dated Jan. 30, 2017 (7 pages).
German Search Report issued in DE 10 2015 122 171.3 dated Nov. 4, 2016 (10 pages).

* cited by examiner

STATOR HOLDER, STATOR ASSEMBLY, METHOD FOR ASSEMBLING A STATOR ASSEMBLY, TORQUE SENSOR DEVICE WITH A STATOR ASSEMBLY AND A STATOR HOLDER, AND MOTOR VEHICLE WITH A TORQUE SENSOR DEVICE

The invention relates to a stator holder for a torque sensor device for sensing a torque applied to a shaft, in particular for sensing a torque applied to a steering shaft of a motor vehicle, wherein the stator holder has a receiving region extending in the axial direction along an axis of rotation of the stator holder and a fastening region which, in a functional use state, is adjacent to the receiving region in the axial direction and extends in the axial direction along the axis of rotation of the stator holder. In this case, the receiving region is designed for receiving a first stator element and a second stator element on the stator holder, and the fastening region for the fastening of the stator holder on the shaft for rotation therewith, wherein the fastening region has a fastening sleeve for this purpose.

Furthermore, the invention relates to a stator assembly for a torque sensor device for sensing a torque applied to a shaft, in particular for sensing a torque applied to a steering shaft of a motor vehicle, wherein the stator assembly has a stator holder, a first stator element, a second stator element and two fixing rings. In this case, a first fixing ring serves for the axial fixing of the first stator element on the stator holder and a second fixing ring for the axial fixing of the second stator element on the stator holder.

Furthermore, the invention relates to a method for assembling an above-described stator assembly which has an above-described stator holder, and to a torque sensor device with an above-described stator assembly with an above-described stator holder, and to a motor vehicle with an above-described torque sensor device.

Stator holders and stator assemblies for torque sensor devices and torque sensor devices of the type in question for steering shafts of motor vehicles are basically known from the prior art, for example from DE 10 2013 006 379 A1 or EP 1 269 133 B1. The torque sensor devices are generally assembled here from a plurality of components and customarily have, inter alia, a stator assembly with a stator holder.

Torque sensor devices are designed for sensing a torque applied to a shaft, wherein, in particular in motor vehicles, torque sensor devices are provided for sensing a steering moment applied by the driver to a steering shaft. Such torque sensor devices are used, for example, in electric steering systems in order to activate the electric driving motor of the steering system on the basis of the steering moment applied by a driver, for example in order to provide appropriate steering assistance.

As a rule, torque sensor devices are used in conjunction with an axially divided shaft and with a torque rod of defined, known torsional rigidity, wherein the torque rod here connects a first part of the axially divided shaft to a second part of the axially divided shaft. If a torque is applied to the shaft, this brings about torsion of the two parts of the shaft with respect to each other about a measurable torsion angle, wherein the torsion angle arises depending on the applied torque and the rigidity of the torque rod, and therefore, in the case of a defined, known rigidity of the torque rod, the applied torque can be determined from the sensed torsion angle.

In order to measure the torsion angle resulting from an applied torque, various measuring principles and sensor arrangements are known, wherein use is very frequently made of magnetic sensor systems, in which an encircling ring magnet, which is generally designed as a permanent magnet, is connected to the first part of the steering shaft for rotation therewith, and in which a stator holder, on which magnetically conductive stator elements are accommodated, is connected to the second part of the shaft for rotation therewith, wherein the stator holder is customarily arranged in the radial direction concentrically about the ring magnet with a small air gap. Via the stator elements which are fastened to the stator holder and customarily consist of two separate parts each having a region which is in the shape of an annular disc and extends outwards away from the shaft in the radial direction, and of tabs extending in the axial direction, the magnetic flux of the ring magnet can be conducted to a magnetic sensor, for example a Hall sensor, and evaluated.

If the ring magnet which is connected to the first part of the shaft for rotation therewith is moved relative to the stator holder, which is connected to the second part of the shaft, by means of a rotational movement of the shaft, the magnetic flux density in the two stator elements fastened to the stator holder changes, which can be sensed by means of the magnetic sensor. The change in the magnetic flux density in the two stator elements is dependent inter alia on the size of the relative movement of the ring magnet in relation to the stator holder, i.e. on the torsion angle. A conclusion can therefore be drawn about the torsion angle from the change in the sensed flux density and, with knowledge of the torsional rigidity of the torque rod, the torque applied to the shaft can in turn be determined from the torsion angle.

For the fastening to the second part of the shaft, the stator holders known from the prior art customarily have a fastening region extending in the axial direction, with a fastening sleeve which is adjoined by a receiving region which is designed for receiving the two stator elements, wherein the stator holder is formed integrally in the case of the solutions known from the prior art, i.e. the receiving region and the fastening region are connected integrally to each other.

The receiving region of the stator holder is generally of sleeve-shaped design here and, on its inner side, has recesses which correspond to the tabs extending in the axial direction of the stator elements and into which the tabs of the stator elements can each be introduced in the axial direction from the outside.

Since the fastening region with the fastening sleeve customarily adjoins one side of the receiving region, an inner diameter of the stator element, which is introduced into the receiving region in the axial direction from a side facing the fastening region, has to be at least larger than an outer diameter of the fastening sleeve.

If stator elements which are standardized in their size and their configuration, especially with regard to the inner diameter, are used or if such stator elements are intended to be used, a corresponding stator assembly with a stator holder known from the prior art can be used only up to a certain shaft diameter. For larger shaft diameters, the closest stator element size is required, which is often undesirable for construction space and cost reasons.

It is therefore an object of the invention to provide a stator holder which is improved in this respect, in particular a stator holder which makes it possible to extend the use range of standardized stator elements in the direction of larger shaft diameters. It is a further object to provide an improved stator assembly, an alternative method for assembling a stator assembly, an improved torque sensor device and an improved motor vehicle.

This object is achieved by a stator holder according to the invention, by a stator assembly according to the invention, by a method according to the invention for assembling a stator assembly, by a torque sensor device according to the invention and by a motor vehicle according to the invention with the features according to the respective independent patent claims. Advantageous embodiments of the invention are the subject matter of the dependent patent claims, the description and the figures and are explained in more detail below.

A stator holder according to the invention for a torque sensor device for sensing a torque applied to a shaft, in particular for sensing a torque applied to a steering shaft of a motor vehicle, has a receiving region extending in the axial direction along an axis of rotation of the stator holder, and a fastening region which, in a functional use state, is adjacent to the receiving region in the axial direction and extends in the axial direction along the axis of rotation of the stator holder, wherein the receiving region is designed for receiving a first stator element and a second stator element on the stator holder, and the fastening region has a fastening sleeve for the fastening of the stator holder on the shaft for rotation therewith.

According to the invention, the receiving region and the fastening region are formed by separate components and/or separate assemblies. That is to say, according to the invention, the stator holder is not formed integrally, but rather the receiving region and the fastening region have to be assembled first for a functional use state. This has the advantage that the stator element, which is introduced into the receiving region in the axial direction from the side facing the fastening region, no longer has to be guided via the fastening sleeve. That is to say, the inner diameter of said stator element no longer has to be larger than the outer diameter of the fastening sleeve. As a result, fastening sleeves with a larger outer diameter can be used with the same stator element. Consequently, stator assembly and/or torque sensor devices can be used with a stator holder according to the invention with the same size of the stator elements, even in the case of shafts with larger diameters.

In an advantageous refinement of a stator holder according to the invention, the stator holder is designed in such a manner that the first stator element, as in the solutions known from the prior art, can be introduced into the receiving region in the axial direction from a side facing away from the fastening region, with respect to a functional use state of the stator holder, and can preferably be secured axially on the stator holder by means of a first fixing ring which can be mounted in the axial direction on the side facing away from the fastening region.

In a further advantageous refinement of a stator holder according to the invention, the stator holder is designed in such a manner that, as in the solutions known from the prior art, the second stator element can be introduced into the receiving region in the axial direction from a side facing the fastening region, with respect to a functional use state of the stator holder, and can preferably be secured axially on the stator holder by means of a second fixing ring which can be mounted in the axial direction on the side facing the fastening region.

A stator holder according to the invention is preferably designed in such a manner that, with the introduction of a stator element, the latter is simultaneously positioned in the radial direction. For this purpose, the stator holder has at least one guide in the receiving region, preferably at least for each stator element. As a result, an air gap with respect to a ring magnet arranged in the centre of the receiving region in a functional use state of a torque sensor device according to the invention can arise in a particularly simple manner.

In a further advantageous refinement of a stator holder according to the invention, the second fixing ring is part of the component forming the fastening region and/or of the assembly forming the fastening region. The second fixing ring is preferably connected here to the fastening sleeve in an end region of the fastening sleeve that faces the receiving region, with respect to a functional use state of the stator holder. That is to say, the second fixing ring is preferably fastened to the fastening sleeve or forms an assembly, in particular the fastening region, with the fastening sleeve.

In a further advantageous refinement of a stator holder according to the invention, the second fixing ring is formed integrally with the fastening sleeve. The second fixing ring is preferably arranged on the outside on the fastening sleeve in the radial direction and in particular is fastened to the fastening sleeve via a flange extending outwards in the radial direction, wherein the flange preferably forms that end of the fastening sleeve which faces the receiving region. A particularly advantageous refinement of a stator holder according to the invention can therefore be achieved.

The fastening sleeve of a stator holder according to the invention can be composed of metal and/or of plastic, wherein a fastening sleeve can be produced from metal, for example by turning or deep drawing. The second fixing ring can likewise be produced from metal and/or plastic. It can be connected to the fastening sleeve in a wide variety of ways, depending on the combination of materials of the second fixing ring and the fastening sleeve. For example, it can be connected to the fastening sleeve by adhesive bonding or welding, or can be injection moulded onto the fastening sleeve in a plastics injection-moulding process.

A stator assembly according to the invention for a torque sensor device for sensing a torque applied to a shaft, in particular for sensing a torque applied to a steering shaft of a motor vehicle, has an above-described stator holder according to the invention, a first stator element, a second stator element and two fixing rings, wherein a first fixing ring serves for the axial fixing of the first stator element on the stator holder and a second fixing ring for the axial fixing of the second stator element on the stator holder.

The first stator element is preferably introduced here into the receiving region of the stator holder from the side facing away from the fastening region, is particularly preferably positioned in the radial direction, and in particular is secured axially on the stator holder by means of the first fixing ring.

The second stator element is preferably introduced into the receiving region from the side facing the fastening region, is particularly preferably positioned in the radial direction and secured axially on the stator holder by means of the component forming the fastening region or the assembly forming the fastening region, wherein the second fixing ring is preferably part of the component forming the fastening region and/or of the assembly forming the fastening region.

The second fixing ring is preferably connected or fastened here to the fastening sleeve in an end region of the fastening sleeve that faces the receiving region, with respect to a functional use state of the stator holder. For this purpose, the second fixing ring is particularly preferably formed integrally with the fastening sleeve.

A method according to the invention for assembling a stator assembly for a torque sensor device for sensing a torque applied to a shaft, in particular for sensing a torque applied to a steering shaft of a motor vehicle, wherein the stator assembly has an above-described stator holder according to the invention, in particular for assembling an above-described stator assembly according to the invention, is characterized in that in a first step the second stator element is introduced into the receiving region of the stator holder in the axial direction from a side facing the fastening region, with respect to a functional use state of the stator holder.

Preferably, in a second step, the receiving region of the stator holder is connected to the fastening region of the stator holder.

In particular, at the same time with the connection of receiving region and fastening region in the second step, optionally in a further step the second stator element is axially secured on the stator holder in the axial direction by means of a second fixing ring which can be mounted in the axial direction on the side facing the fastening region of the stator holder.

In an advantageous implementation of a method according to the invention, in a further step, a first stator element is introduced into the receiving region of the stator holder in the axial direction from a side facing away from the fastening region, with respect to a functional use state of the stator holder, and preferably is secured axially on the stator holder in the axial direction by means of a first fixing ring which can be mounted in the axial direction on the side facing away from the fastening region of the stator holder, in particular in a further step. Of course, the first stator element can be mounted here and/or fixed in the axial direction both before the steps described above in conjunction with the second stator element and the fastening region, or after said steps. Furthermore, the axial securing by means of the first fixing ring also does not have to take place directly following the introduction of the stator element into the receiving region. This can also take place, for example, only after the second stator element has been introduced and fixed axially.

A torque sensor device according to the invention for sensing a torque applied to a shaft, in particular for sensing a torque applied to a steering shaft of a motor vehicle, has an above-described stator assembly according to the invention with an above-described stator holder according to the invention.

A motor vehicle according to the invention with a torque sensor device for sensing a torque applied to a steering shaft of a motor vehicle has an above-described torque sensor device according to the invention.

The advantageous refinements presented with regard to the stator holder and the stator assembly, and the advantages thereof, apply not only to the stator holder and to the stator assembly, but also correspondingly to a method according to the invention, a torque sensor device according to the invention and a motor vehicle according to the invention.

Further features of the invention emerge from the claims, the figures and the description of the figures. All of the features and combinations of features mentioned above in the description and the features and combinations of features mentioned below in the description of the figures and/or shown in the figures alone are usable not only in the respectively stated combination, but also in other combinations or else on their own.

Figure 1B:
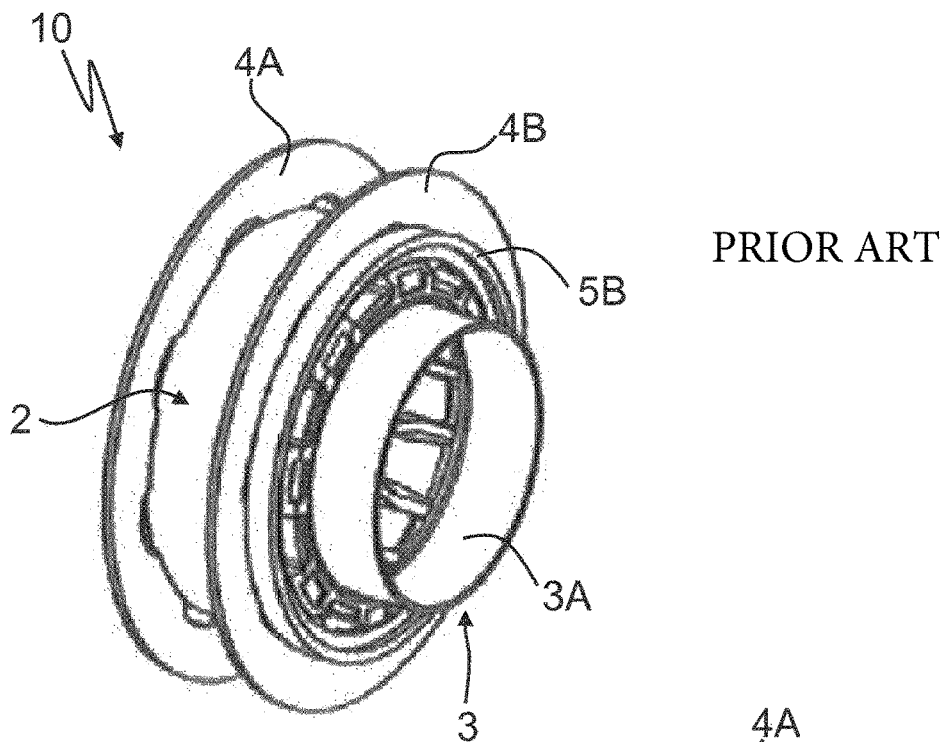
Figure 1C:
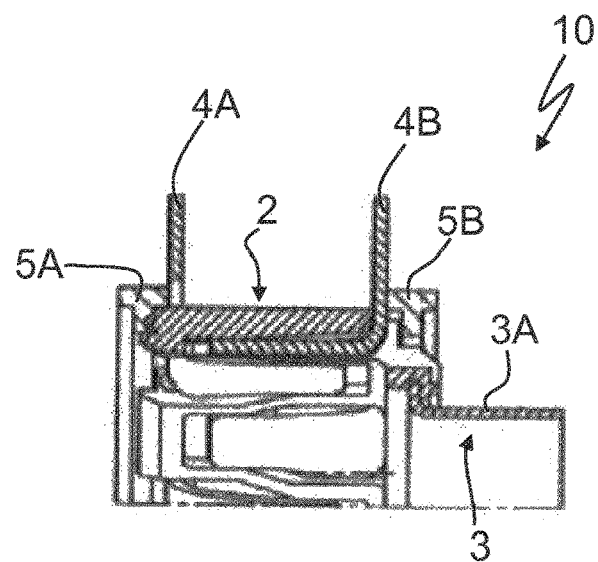
Figure 1D:
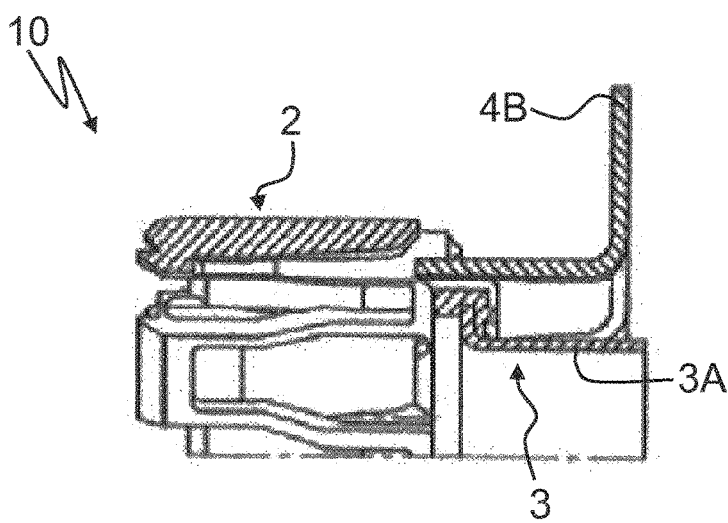
Figure 2:
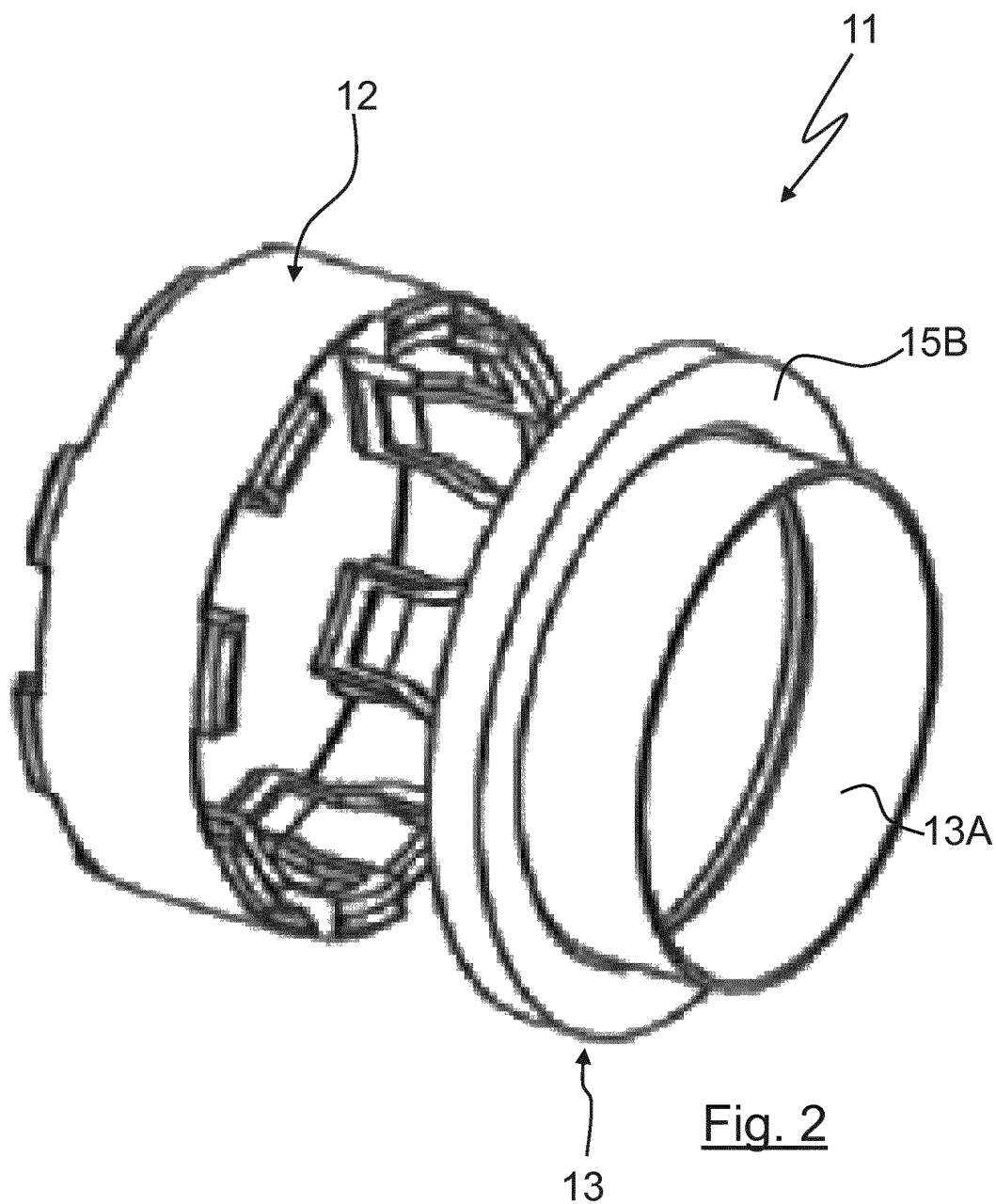
Figure 3A:
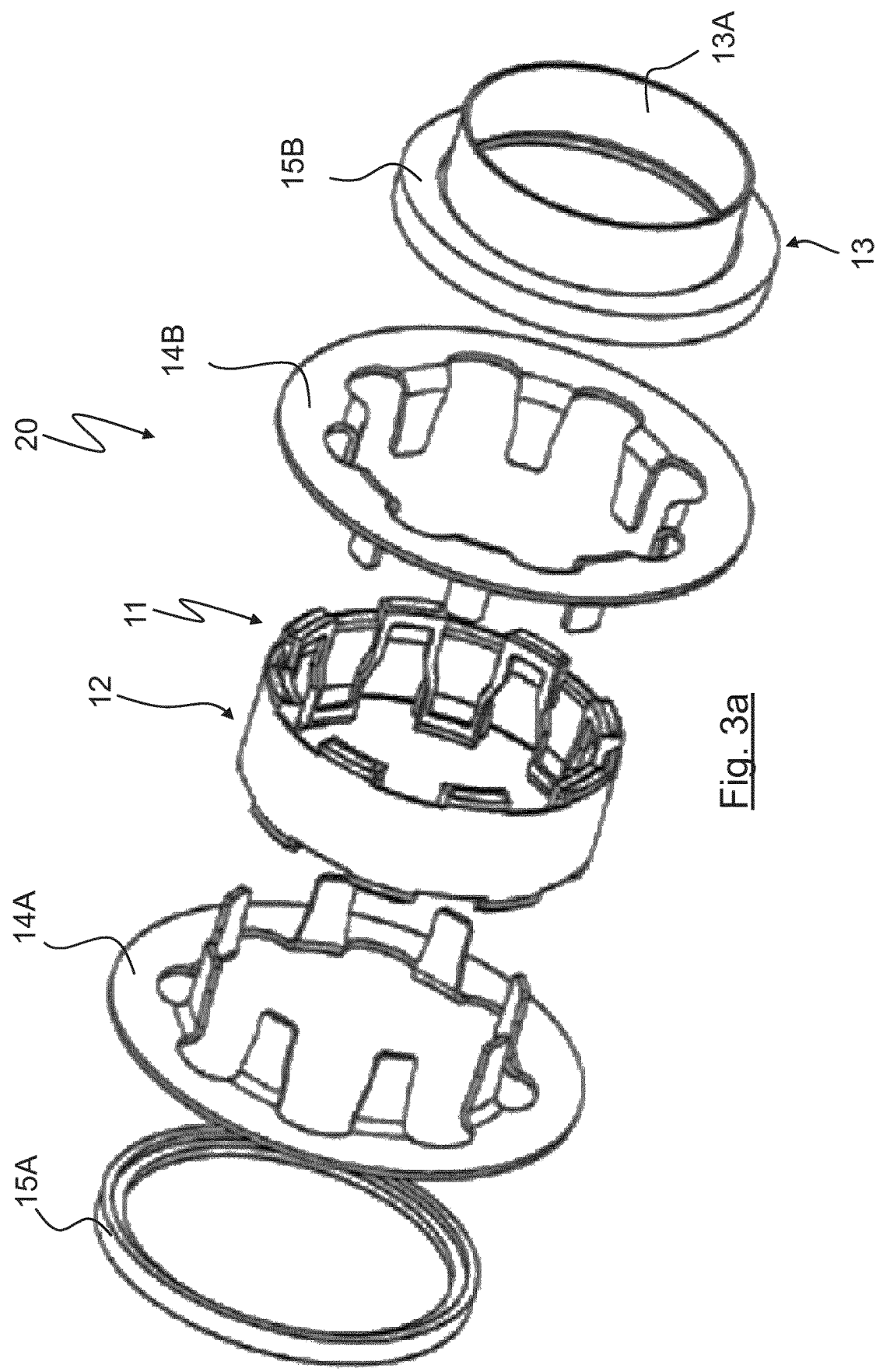
Figure 3B:
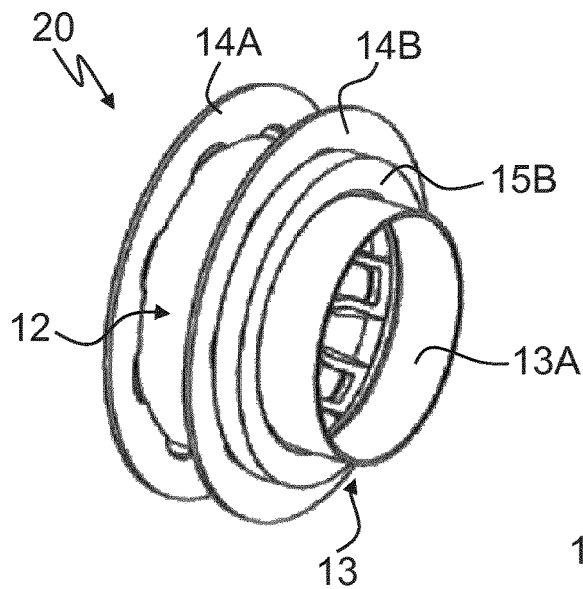
Figure 3C:
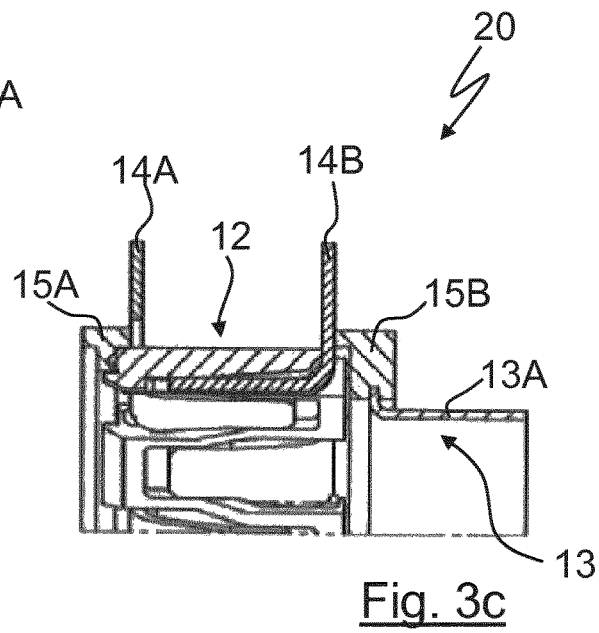
Figure 3D:
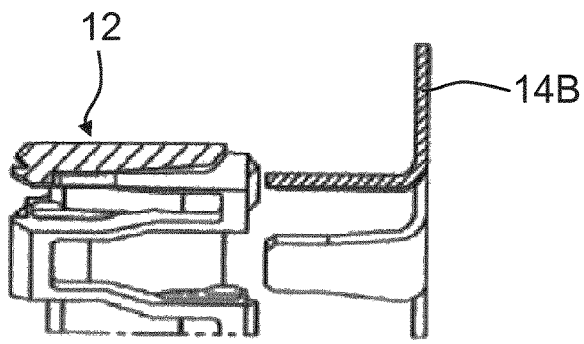
Figure 3E:
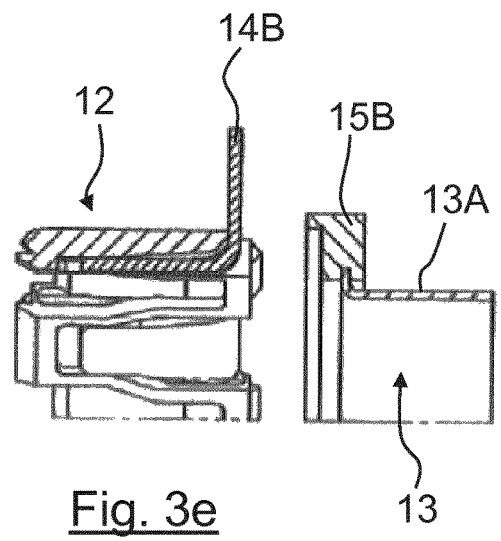

The invention will now be explained in more detail using a preferred exemplary embodiment with reference to the attached drawings, in which:

FIG. 1a shows an exploded illustration of a stator assembly known from the prior art, FIG. 1b shows a perspective illustration of the stator assembly known from the prior art in an assembled state, FIG. 1c shows a section through the stator assembly which is illustrated in FIG. 1b and is known from the prior art, FIG. 1d shows a section through the stator assembly illustrated in FIGS. 1b and 1c and known from the prior art before the introduction of the second stator element into the receiving region of the stator holder, FIG. 2 shows an exploded illustration of a stator holder according to the invention, FIG. 3a shows an exploded illustration of a stator assembly according to the invention with a stator holder according to the invention, FIG. 3b shows a perspective illustration of the stator assembly according to the invention from FIG. 3a in an assembled state, FIG. 3c shows a section through the stator assembly according to the invention illustrated in FIG. 3b, FIG. 3d shows the stator assembly according to the invention from FIGS. 3b and 3c in a sectional illustration before a second stator element is introduced into the receiving region of the stator holder, and FIG. 3e shows the stator assembly according to the invention from FIGS. 3b and 3c in a sectional illustration after the second stator element is introduced into the receiving region, but before the axial securing of the second stator element.

FIG. 1 shows an exploded illustration of a stator assembly 10 known from the prior art for a torque sensor device known from the prior art, wherein the stator assembly 10 is designed especially for a torque sensor device which is designed for sensing a torque applied to a steering shaft (not illustrated here) of a motor vehicle, wherein the steering shaft has a first part and a second part, which parts are each connected to each other in the axial direction by means of a torque rod and are thus twistable in relation to each other by application of a torque. The twisting can be sensed with the aid of the torque sensor device, for which the stator assembly 10 described here is provided, and the torque applied to the shaft can be determined on the basis of said twisting. Torque sensor devices of the type in question, in particular the design thereof and the required configuration of the components, in particular stator holder and stator assemblies, are generally known in the prior art, in particular from EP 1 269 133 B1 or DE 10 2013 006 379 A1, to which reference is hereby expressly made in this regard.

The stator assembly 10, which is known from the prior art, from FIG. 1 is designed for connecting to the second part of the steering shaft for rotation therewith and, for this purpose, has a stator holder 1 with a receiving region 2 and a fastening region 3, which are arranged lying next to each other in the axial direction.

The receiving region 2 is designed here for receiving a first stator element 4A and a second stator element 4B, wherein the two stator elements 4A and 4B can each be introduced axially into the receiving region 2 with their tabs, which extend in the axial direction, being positioned in the radial direction, and can each be fixed on the stator holder 1 axially from the outside by means of a fixing ring 5A or 5B. Directly adjacent to the receiving region 2, the stator holder 1 has a cylindrical fastening sleeve 3A for the connection of the stator holder 1 to the second part of the steering shaft.

For better understanding, FIG. 1b shows a perspective illustration of the stator assembly 10 from FIG. 1a in an assembled state and FIG. 1c shows same in a sectional illustration. It can readily be seen in particular in FIG. 1c how the second stator element 4B is introduced into the receiving region 2 in the axial direction and is secured axially on the receiving region 2 by means of the second fixing ring 5B. The first stator element 4A has been correspondingly introduced into the receiving region 2, likewise in the axial direction, from a side facing away from the fastening region 3, and secured on the stator holder 1 in the axial direction by means of the associated first fixing ring 5A.

In the case of this stator assembly 10, the receiving region 2 and the fastening sleeve 3A of the fastening region 3 are fixedly connected to each other, i.e. cannot be disassembled without being destroyed. It is known from the prior art to provide a fastening sleeve 3A from metal and to encapsulate the latter with plastic in order to produce the receiving region 2, or else to also provide the fastening sleeve 3A from plastic and to produce same integrally together with the receiving region 2 or as a multi-component injection-moulded part.

Owing to the fact that, in the case of this stator holder 1 known from the prior art, the fastening sleeve 3A is fixedly connected to the receiving region 2, in order to assemble the stator assembly 10 the first stator element 4A and the second stator element 4B each need to be introduced into the receiving region 2 from the outside in the axial direction, wherein the second stator element 4B has to be guided via the fastening sleeve 3A, see FIG. 1d.

This means that the inner diameter of the second stator holder 4B has to be larger than the maximum outer diameter of the fastening sleeve 3A. If geometrically standardized stator elements 4A, 4B which are known from the prior art and are available only in defined dimension sizes are used, or if the use of standardized stator elements 4A, 4B is the aim, the maximum possible outer diameter of the fastening sleeve 3A is produced depending on the inner diameter of the available stator element, in this case depending on the inner diameter of the second stator element 4B. As a result, a shaft diameter for the steering shaft has an upward limit because of the limited outer diameter of the fastening sleeve 3A.

For steering shafts with larger shaft diameters, it is therefore required, in particular if the use of a larger stator element is not possible, to use a structurally differently configured stator holder, for example a stator holder 11 according to the invention, as is shown in an exploded illustration in FIG. 2.

The stator holder 11 according to the invention that is illustrated in FIG. 2 is designed similarly in principle to the stator holder 1 which is described above and is known from the prior art. However, in contrast thereto, the stator holder 11 has a fastening region 13 formed separately from the receiving region 12. That is to say, the receiving region 12 and the fastening region 13 are formed by separate components or separate assemblies. As a result, neither of the two stator elements 14A, 14B has to be introduced any longer into the receiving region 12 via the fastening sleeve 13A. Consequently, the inner diameter of the second stator element 14B does not have to be larger than the outer diameter of the steering shaft.

This can readily be seen with reference to FIG. 3a which shows an exploded illustration of a stator assembly 20 according to the invention with a stator holder 11 according to the invention. For better understanding, the stator assembly 20 from FIG. 3a is additionally shown in FIG. 3b in the assembled state and in a sectional illustration in FIG. 3c.

Consequently, because of the stator holder 11 according to the invention with a receiving region 12 formed separately from the fastening region 13, the difference between the assembly of a stator assembly 10 known from the prior art and a stator assembly 20 according to the invention consists in that the fastening sleeve 13A is not connected to the receiving region 12 at the time of the introduction of the two stator elements 14A and 14B, in particular at the time of the introduction of the second stator element 14B, and therefore the second stator element 14B does not have to be guided via the fastening sleeve 13A.

On the contrary, the fastening sleeve 13A, which is fixedly connected to the second fixing ring 15B and forms the fastening region 13, and is introduced into the receiving region only after the second stator element 14B, is connected to the receiving region 12 and to the second stator element 14B which has been introduced therein.

For a particularly simple installation process, in particular in order not to necessitate an additional mounting step in relation to a stator holder 10 known from the prior art, the second fixing ring 15B is arranged here on the fastening sleeve 13A at an end of the fastening sleeve 13A that faces the receiving region 12, and is fixedly connected to said fastening sleeve 13A such that, when the fastening region 13 is connected to the receiving region 12, the second stator element 14B, which has been introduced previously into the receiving region 12 in the axial direction, is automatically secured axially on the stator holder 11, see FIGS. 3d and 3e.

A stator holder 11 according to the invention is preferably formed from plastic, and the first stator element 14A and the second stator element 14B of a stator assembly 20 according to the invention are preferably in each case designed to be magnetically soft and are magnetically conductive, wherein the two stator elements 14A, 14B preferably each have a region which is in the shape of an annular disc, is oriented perpendicularly to the axis of rotation of the steering shaft and extends outwards in the radial direction, wherein, in a functional, assembled state of the stator assembly 20, those regions of the first stator element 14A and of the second stator element 14B that are designed in the shape of annular discs are preferably arranged in parallel planes at a distance from each other in the axial direction.

With the aid of a stator holder 11 according to the invention or a stator assembly 20 according to the invention, it is therefore possible to provide a torque sensor device according to the invention which, without having to dispense with the use of standardized available stator elements, can be used for larger shaft diameters than a torque sensor device known from the prior art. This gives rise to a considerable cost-saving potential, particularly since the installation process for assembling a stator assembly 20 according to the invention virtually scarcely differs from the installation process of a stator assembly 10 known from the prior art.

Of course, a multiplicity of structural modifications to the explained exemplary embodiments are possible without departing from the content of the patent claims.

The invention claimed is:

1. A stator holder for a torque sensor device for sensing a torque applied to a steering shaft of a motor vehicle, the stator holder comprising:
   a receiving region extending in the axial direction along an axis of rotation of the stator holder; and
   a fastening region which, in a functional use state, is adjacent to the receiving region in the axial direction and extends in the axial direction along the axis of rotation of the stator holder,
   wherein the receiving region is for receiving a first stator element and a second stator element on the stator holder, wherein the fastening region has a fastening sleeve for the fastening of the stator holder on the shaft for rotation therewith, wherein the receiving region and the fastening region are formed by separate components and/or separate assemblies, and wherein the stator holder is configured so that the second stator element is introduced into the receiving region in the axial direction from a side facing the fastening region, with respect to a functional use state of the stator holder, and is secured axially on the stator holder by a second fixing ring which can be mounted in the axial direction on the side facing the fastening region.

2. The stator holder according to claim 1, wherein the stator holder is configured so that the first stator element is introduced into the receiving region in the axial direction from a side facing away from the fastening region, with respect to a functional use state of the stator holder, and is secured axially on the stator holder by a first fixing ring which is mounted in the axial direction on the side facing away from the fastening region.

3. The stator holder according to claim 1, wherein the second fixing ring is part of the component forming the fastening region and/or of the assembly forming the fastening region, and is connected to the fastening sleeve in an end region of the fastening sleeve that faces the receiving region, with respect to a functional use state of the stator holder.

4. The stator holder according to claim 3, wherein the second fixing ring is formed integrally with the fastening sleeve.

5. A stator assembly for a torque sensor device for sensing a torque applied to a steering shaft of a motor vehicle, the stator assembly comprising:
- a stator holder as claimed in claim 1;
- a first stator element;
- a second stator element; and
- two fixing rings, wherein a first fixing ring serves for the axial fixing of the first stator element on the stator holder and a second fixing ring for the axial fixing of the second stator element on the stator holder.

6. A method for assembling a stator assembly for a torque sensor device for sensing a torque applied to a steering shaft of a motor vehicle, wherein the stator assembly has a stator holder for assembling the stator assembly according to claim 5, the method comprising:
- in a first step a second stator element is introduced into the receiving region of the stator holder in the axial direction from a side facing the fastening region, with respect to a functional use state of the stator holder;
- in a second step the receiving region of the stator holder is connected to the fastening region of the stator holder; and
- at the same time with the connection of receiving region and fastening region in the second step, the second stator element is axially secured on the stator holder in the axial direction by a second fixing ring mounted in the axial direction on the side facing the fastening region of the stator holder.

7. The method according to claim 6, further comprising:
- introducing a first stator element into the receiving region of the stator holder in the axial direction from a side facing away from the fastening region, with respect to a functional use state of the stator holder; and
- axially securing the first stator element on the stator holder in the axial direction by a first fixing ring mounted in the axial direction on the side facing way from the fastening region of the stator holder.

8. A torque sensor device for sensing a torque applied to a steering shaft of a motor vehicle, the torque sensor device comprising a stator assembly with a stator holder, according to claim 5.

9. A motor vehicle with a torque sensor device for sensing a torque applied to a steering shaft of a motor vehicle, wherein the torque sensor device is as claimed in claim 8.

* * * * *